(12) United States Patent
Kim et al.

(10) Patent No.: US 11,247,656 B2
(45) Date of Patent: Feb. 15, 2022

(54) AIR CONDITIONING SYSTEM CONTROL METHOD FOR VEHICLE

(71) Applicants: Hyundai Motor Company, Seoul (KR); Kia Motors Corporation, Seoul (KR)

(72) Inventors: Yeon Ho Kim, Seoul (KR); Seung Ho Lee, Seoul (KR); Jae Yeon Kim, Hwaseong-si (KR); Wan Je Cho, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 241 days.

(21) Appl. No.: 16/663,630

(22) Filed: Oct. 25, 2019

(65) Prior Publication Data

US 2021/0053550 A1 Feb. 25, 2021

(30) Foreign Application Priority Data

Aug. 21, 2019 (KR) ........................ 10-2019-0102290

(51) Int. Cl.
*B60W 10/30* (2006.01)
*B60H 1/32* (2006.01)
(Continued)

(52) U.S. Cl.
CPC ............... *B60W 10/30* (2013.01); *B60H 1/12* (2013.01); *B60H 1/3213* (2013.01); *B60H 2001/006* (2013.01); *B60H 2001/3263* (2013.01)

(58) Field of Classification Search
CPC ....... B60W 10/30; B60H 1/12; B60H 1/3213; B60H 1/00771; B60H 1/00828;
(Continued)

(56) References Cited

U.S. PATENT DOCUMENTS 7,061,202 B2 * 6/2006 Sunaga ............... B60H 1/00835
165/202
9,796,243 B2 * 10/2017 Dage .................. B60H 1/00771
(Continued)

FOREIGN PATENT DOCUMENTS

| KR | 1020090106691 A | 10/2009 |
| KR | 101235134 B1 | 2/2013 |
| KR | 101294192 B1 | 8/2013 |

*Primary Examiner* — Marc E Norman
(74) *Attorney, Agent, or Firm* — Slater Matsil, LLP (57) ABSTRACT

A control method of an air conditioning system for a vehicle includes a process A of determining whether arrival at a destination is imminent based on data detected from a data detecting unit by a controller and comparing a target temperature of an evaporator with an actual temperature of the evaporator in a state of cooling a vehicle interior while the vehicle is running. A process B includes controlling a blow motor, a compressor, and a vent discharge control unit by determining whether the evaporator is cleaned by the controller through process A, and controlling an outdoor air/indoor air mode operation unit by detecting external humidity and internal humidity. A process C includes controlling the blow motor and the outdoor air/indoor air mode operation unit by comparing an external temperature with the temperature of the evaporator.

20 Claims, 3 Drawing Sheets (51) Int. Cl.
*B60H 1/12* (2006.01)
*B60H 1/00* (2006.01)

(58) Field of Classification Search
CPC .............. B60H 1/3207; B60H 1/00849; B60H 2001/006; B60H 2001/3263; F25B 49/022
See application file for complete search history.

(56) References Cited

U.S. PATENT DOCUMENTS

| | | |
|---|---|---|
| 9,908,386 B2 * | 3/2018 | Trutnovsky ........ B60H 1/00849 |
| 2013/0145647 A1 | 6/2013 | Kim et al. |

* cited by examiner

AIR CONDITIONING SYSTEM CONTROL METHOD FOR VEHICLE

CROSS-REFERENCE TO RELATED APPLICATIONS

This application claims priority to Korean Patent Application No. 10-2019-0102290, filed in the Korean Intellectual Property Office on Aug. 21, 2019, which application is hereby incorporated herein by reference.

TECHNICAL FIELD

The present invention relates to a control method of an air conditioning system for a vehicle.

BACKGROUND

Generally, a vehicle includes an air conditioning system in order to heat or cool an interior of the vehicle.

The air conditioning system, which is to maintain the interior of the vehicle at an appropriate temperature regardless of a change in an external temperature to maintain a comfortable interior environment, is configured to heat or cool the interior of the vehicle through heat exchange by a condenser and an evaporator in a process in which a refrigerant discharged by driving of a compressor is circulated to the compressor through a condenser, a receiver drier, an expansion valve, and the evaporator.

That is, the air conditioning system lowers the temperature and humidity of the interior by condensing a high-temperature high-pressure gas-phase refrigerant compressed by the compressor, by the condenser, passing the refrigerant through the receiver drier and the expansion valve, and then evaporating the refrigerant in the evaporator in a cooling mode in summer.

Recently, as interest in energy efficiency and an environmental contamination problem are increased day by day, there is a need for developing an environmentally friendly vehicle that is capable of substantially replacing an internal combustion engine vehicle, and the environmentally friendly vehicle is commonly divided into an electric vehicle that is driven by using a fuel cell or electricity as a power source, and a hybrid vehicle that is driven by using an engine and an electric battery.

Here, the air conditioning system applied to the electric vehicle has a characteristic of lowering the temperature and humidity of the interior by condensing a high-temperature high-pressure gas-phase refrigerant compressed by the compressor, by the condenser, passing the refrigerant through the receiver drier and the expansion valve, and then evaporating the refrigerant in the evaporator in a cooling mode in summer, that is the same as a general principle, but using a gaseous coolant of high temperature and high pressure as a heater medium in a heating mode in winter.

However, in the conventional air conditioning system as described above, if the running of the vehicle is terminated in the operating state for cooling the interior of the vehicle in the summer, moisture is generated on the surface of the evaporator due to a difference of an external temperature and the temperature of the evaporator, and the generated moisture contaminates the evaporator.

In addition, when the evaporator is contaminated, the evaporator acts as a cause of an unpleasant odor in the interior of the vehicle when the air conditioning system is operated, which causes inconvenience to the occupant and also damages health.

In addition, in order to remove the odor of the contaminated evaporator, it is necessary to use a separate chemical agent or the like, and frequent replacement of the air conditioner filter is required, thereby causing a problem of increasing a maintenance cost.

The above information disclosed in this Background section is only for enhancement of understanding of the background of the invention and therefore it may contain information that does not form the prior art that is already known in this country to a person of ordinary skill in the art.

SUMMARY

The present invention relates to a control method of an air conditioning system for a vehicle. Particular embodiments of the present invention relate to a control method of an air conditioning system for the vehicle that preemptively prevents contamination of an evaporator by preventing moisture from occurring outside the evaporator due to a temperature difference and suppresses occurrence of odor in the vehicle interior due to the contamination of the evaporator.

Embodiments of the present invention can solve problems as discussed above. For example, embodiments provide a control method of an air conditioning system for a vehicle for preemptively preventing contamination of the evaporator due to moisture generation and suppressing the generation of the indoor odor by detecting the temperature of the evaporator to selectively dry the evaporator before arrival at a destination or after starting the vehicle in conjunction with a navigation system.

A control method of an air conditioning system for a vehicle according to an exemplary embodiment of the present invention includes (A) a process of determining whether arrival at a destination is imminent based on data detected from a data detecting unit by a controller and comparing a target temperature of an evaporator with an actual temperature of the evaporator in a state of cooling a vehicle interior while the vehicle is running. (B) A blow motor, a compressor, and a vent discharge control unit are controlled by determining whether the evaporator is cleaned by the controller through the process of determining. An outdoor air/indoor air mode operation unit is controlled by detecting external humidity and internal humidity. (C) The blow motor and the outdoor air/indoor air mode operation unit are controlled by comparing an external temperature with the temperature of the evaporator and determining a charge amount of a battery based on the data detected from the data detecting unit after a predetermined time if the driving of the vehicle is completed and the starting is finished, and finishing the control when an absolute value of the difference of the external temperature and the temperature of the evaporator is equal to or lower than a predetermined temperature.

The process of determining may include a step of operating an air conditioner for the cooling of the vehicle according to an operation of a user or a setting during the running of the vehicle; a step of determining whether it is three minutes before a destination arrival time through the output signal output from the navigation system by the controller; and a step of determining whether an absolute value of a difference of a target temperature of the evaporator and an actual temperature of the evaporator is equal to or lower than 3° C. if it is determined that it is three minutes before the destination arrival time (i.e., if a condition is satisfied).

In the step of determining whether it is 3 minutes before the destination arrival time by the controller through the output signal output from the navigation system, if the condition is not satisfied, the control method is returned to the step of operating the air conditioner for the cooling of the vehicle according to the operation of the user or the setting during the running of the vehicle.

The controlling steps may include a step of determining whether to clean the evaporator by the controller if it is determined that the absolute value of the difference of the target temperature of the evaporator and the actual temperature of the evaporator is equal to or lower than 3° C. through the process of determining, a step of determining whether the dehumidification mode is necessary by the controller if it is determined that the cleaning of the evaporator is necessary, a step of controlling the compressor, a blow motor, and a vent discharge control unit if it is determined that the dehumidification mode is necessary, a step of determining whether external humidity is higher than internal humidity by the controller based on the data detected from the data detecting unit; a step of operating an indoor air circulation mode by controlling an outdoor air/indoor air mode operation unit by the controller if it is determined that the external humidity is higher than the internal humidity (i.e., if the condition is satisfied), and a step of finishing the starting at the arrival at the destination.

In the step of determining whether the evaporator is cleaned by the controller, when the cleaning of the evaporator is not necessary, the step that the vehicle arrives at the destination and the starting is finished may be performed.

In the step of determining whether the dehumidification mode is necessary, if it is determined that the dehumidification mode is necessary, the step that the vehicle arrives at the destination and the starting is finished may be performed.

In the step of controlling the compressor, the blow motor, and the vent discharge control unit by the controller, the controller may lower the RPM of the compressor to be minimally driven, raise the RPM of the blow motor, and optionally open a floor or defrost vent by controlling the vent discharge control unit so as to maintain airflow volume of the dash vent.

The controlling steps may include, if it is determined that the external humidity is lower than the internal humidity in the step of determining whether the external humidity is higher than the internal humidity (i.e., if the condition is not satisfied) by the controller, a step of operating an outdoor air circulation mode by controlling the outdoor air/indoor air mode operation unit by the controller.

In the step of determining whether the cleaning of the evaporator is necessary and the step of determining whether the dehumidification mode is necessary, the controller may provide an option to an occupant by outputting an operation selection button to a display unit along with a guidance message.

The blow motor and the outdoor air/indoor air mode operation unit are controlled by operating the controller when 3 minutes have elapsed since the running of the vehicle is completed and the starting is finished; determining whether an absolute value of the difference of the external temperature and the temperature of the evaporator is larger than 3° C. by the controller based on the data detected from the data detecting unit; determining whether a charge amount of a battery is 20% or more by the controller based on the data if it is determined that the absolute value of the difference of the external temperature and the temperature of the evaporator is larger than 3° C.; controlling the blow motor and the outdoor air/indoor air mode operation unit by the controller if it is determined that the charge amount of the battery is 20% or more; and determining whether the absolute value of the difference of the external temperature and the temperature of the evaporator is equal to or lower than 3° C. by the controller based on the data detected from the data detecting unit, and finishing the control if the condition is satisfied.

In the step of determining whether the absolute value of the difference of the external temperature and the temperature of the evaporator is larger than 3° C. If it is determined that the absolute value of the difference of the external temperature and the temperature of the evaporator is smaller than 3° C., the controller may perform finishing of the control.

In the step of determining whether the charge amount of the battery is 20% or more, if it is determined that the charge amount of the battery is less than 20%, the controller may perform a step of finishing the control.

In the step of determining whether the absolute value of the difference of the external temperature and the temperature of the evaporator is equal to or lower than 3° C., if it is determined that the absolute value of the difference of the external temperature and the temperature of the evaporator is larger than 3° C., the control method may be returned to the step of determining whether the charge amount of the battery is 20% or more.

In the step of controlling the blow motor and the outdoor air/indoor air mode operation unit, the controller may maximally operate the blow motor and control the outdoor air/indoor air mode operation unit to operate an outdoor air circulation mode.

The data detecting unit may include: a navigation system for detecting an expected arrival time at the destination; an evaporator temperature sensor measuring a temperature of the evaporator; a humidity sensor measuring external humidity and interior humidity; an external temperature sensor measuring an external temperature; and a battery sensor measuring a charge amount of a battery.

The process A and the process B may be a key on logic performed until the end of the starting of the vehicle, and the process C may be a key off logic performed after the end of the starting of the vehicle.

As above-described, according to the control method of the air conditioning system for the vehicle according to an exemplary embodiment of the present invention, the contamination of the evaporator due to the moisture generation may be preemptively prevented and the generation of the indoor odor may be suppressed by detecting the temperature of the evaporator to selectively dry the evaporator before the arrival at the destination or after the end of the starting of the vehicle in conjunction with a navigation system.

Also, as the present invention essentially eliminates the unpleasant odor in the vehicle interior when the air conditioning system is in operation by preemptively preventing the contamination of the evaporator due to the moisture generation, it may prevent the occupant's discomfort and the deterioration of the occupant's health.

In addition, as the present invention prevents the contamination of the evaporator, the use of separate chemicals for cleaning the evaporator and the frequent replacement of air conditioner filters may be minimized, thereby reducing a maintenance cost and improving the overall marketability of the vehicle.

The following reference numerals can be used in conjunction with the drawings:
- 10: controller
- 20: data detecting unit
- 21: navigation system
- 22: evaporator temperature sensor
- 24: humidity sensor
- 25: external temperature sensor
- 26: battery sensor
- 30: display unit
- 40: blow motor
- 50: compressor
- 60: vent discharge control unit
- 70: outdoor air/indoor air mode operation unit

DETAILED DESCRIPTION OF ILLUSTRATIVE EMBODIMENTS

An exemplary embodiment of the present invention will hereinafter be described in detail with reference to the accompanying drawings.

Exemplary embodiments described in the present specification and configurations shown in the drawings are just the most preferable exemplary embodiments of the present invention, and do not limit the spirit and scope of the present invention. Therefore, it should be understood that there may be various equivalents and modifications capable of replacing them at the time of filing of the present application.

In order to clarify the present invention, parts that are not connected with the description will be omitted, and the same elements or equivalents are referred to by the same reference numerals throughout the specification.

The size and thickness of each element are arbitrarily shown in the drawings, but the present invention is not necessarily limited thereto, and in the drawings, the thickness of layers, films, panels, regions, etc., are exaggerated for clarity.

Throughout this specification and the claims which follow, unless explicitly described to the contrary, the word "comprise" or variations such as "comprises" or "comprising" will be understood to imply the inclusion of stated elements but not the exclusion of any other elements.

Further, the terms, " . . . unit", " . . . mechanism", " . . . portion", " . . . member", etc. used herein mean a unit of inclusive components performing at least one or more functions or operations.

Figure 1:
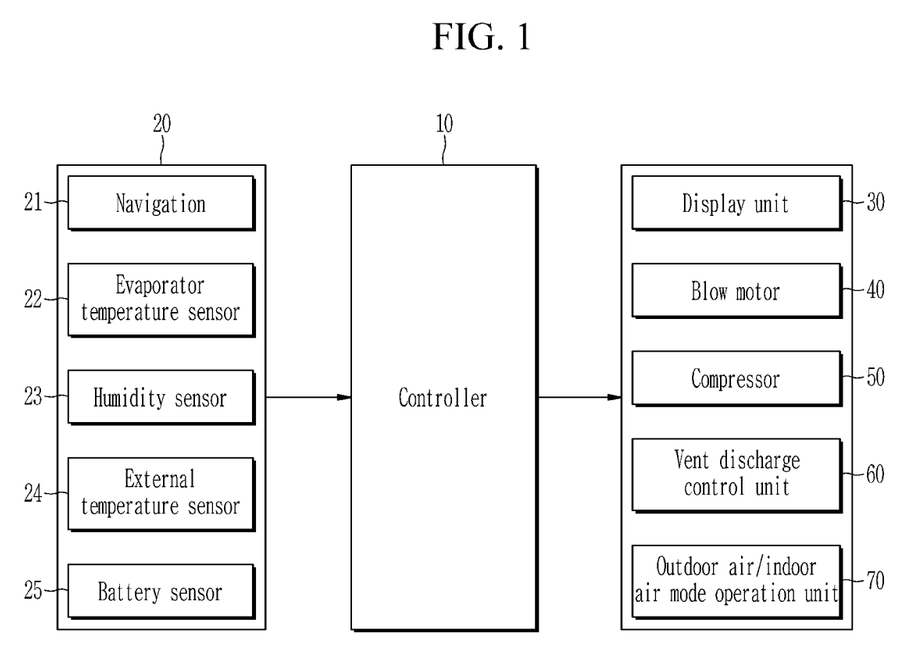
FIG. 1 is a block diagram of an air conditioning system control apparatus to which a control method of an air conditioning system for a vehicle according to an exemplary embodiment of the present invention is applied.

FIG. 1 is a block diagram of an air conditioning system control apparatus to which a control method of an air conditioning system for a vehicle according to an exemplary embodiment of the present invention is applied.

Referring to FIG. 1, the control method of the air conditioning system for the vehicle according to an exemplary embodiment of the present invention is controlled by a controller 10, and is applied to an air conditioning system operated for cooling the vehicle interior in summer in an electric vehicle, an internal combustion engine vehicle, or a hybrid vehicle.

As shown in FIG. 1, the air conditioning system may be controlled by the air conditioning system control apparatus, and the air conditioning system control apparatus may include the controller 10 and a data detecting unit 20.

Here, the data detecting unit 20 may detect data for preventing moisture generation outside the evaporator (not shown) provided in an HVAC module of the vehicle in the air conditioning system.

The data detected by the data detecting unit 20 is transmitted to the controller 10. The data detecting unit 20 may include a navigation system 21, an evaporator temperature sensor 22, a humidity sensor 23, an external temperature sensor 24, and a battery sensor 25.

First, the navigation system 21 detects an expected arrival time at a destination while driving the vehicle, and transmits a signal corresponding thereto the controller 10.

The evaporator temperature sensor 22 measures the temperature of the evaporator, and sends a signal corresponding thereto to the controller 10.

The humidity sensor 23 measures the external humidity and the vehicle's internal humidity, and sends a signal corresponding thereto to the controller 10. The external temperature sensor 24 measures the external temperature, and sends a signal corresponding thereto to the controller 10.

Also, the battery sensor 25 may measure the amount of charge of the battery and transmit a signal thereof to the controller 10.

The controller 10 determines whether water is generated in the evaporator during the driving of the vehicle and after the end of the driving based on the data detected by the data detecting unit 20 to control a display unit 30, a blow motor 40, a compressor 50, a vent discharge control unit 60, and an outdoor air/indoor air mode operation unit 70 so as to prevent the contamination of the evaporator due to the moisture generation.

Here, the blow motor 40 may be a blower provided inside a non-illustrated HVAC module to inflow the outdoor air to the interior of the vehicle. The vent discharge control unit 60 may adjust an air volume of wind discharged to a dash discharge port, a floor discharge port, and a defrost discharge port, which are provided in the interior of the vehicle, according to the control signal of the controller 10.

For this purpose, the controller 10 may be implemented with at least one processor operating by a predetermined program, and the predetermined program may include a series of instructions for performing each step included in the control method of the air conditioning system according to an exemplary embodiment of the present invention described below.

Figure 2:
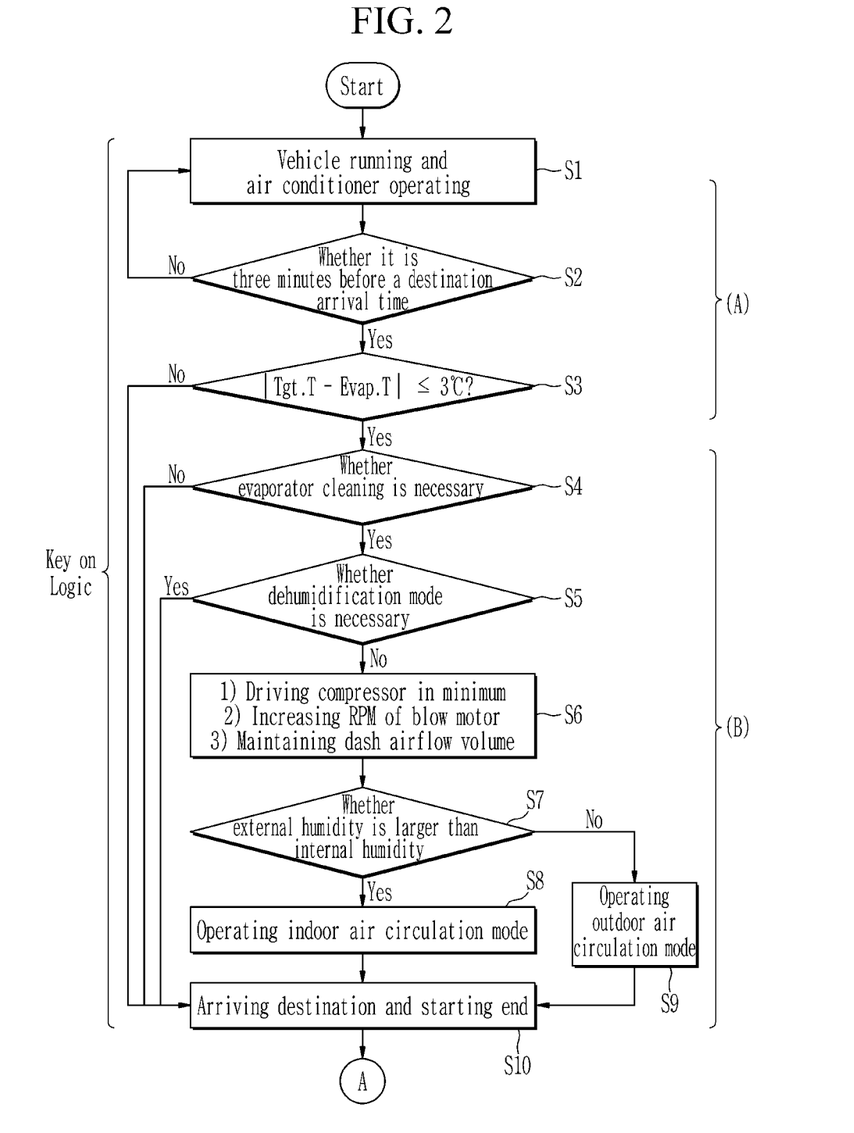
FIG. 2 and FIG. 3 are control flowcharts to explain a control method of an air conditioning system for a vehicle according to an exemplary embodiment of the present invention.

FIG. 2 is a control flowchart to explain a control method of an air conditioning system for a vehicle according to an exemplary embodiment of the present invention.

Referring to FIG. 2, the control method of the air conditioning system for the vehicle according to an exemplary embodiment of the present invention includes: a process A of determining whether arrival at the destination is imminent based on the data detected by the data detecting unit 20, by the controller 10, and comparing a target temperature of the evaporator with an actual temperature of the evaporator in a state cooling the vehicle interior during the driving of the vehicle; a process B of controlling the blow motor 40, the compressor 50, and the vent discharge control unit 60 by determining whether the evaporator is cleaned by the controller 10 through the process A and controlling the outdoor air/indoor air mode operation unit 70 by detecting external humidity and internal humidity; and a process C of controlling the blow motor 40 and the outdoor air/indoor air mode operation unit 70 by comparing an external temperature with the temperature of the evaporator and determining a charge amount of a battery based on the data detected from the data detecting unit 20 after a predetermined time if the driving of the vehicle is completed and the starting is finished, and finishing the control when an absolute value of the difference of the external temperature and the temperature of the evaporator is equal to or lower than a predetermined temperature.

Here, the process (A) and the process (B) may each be a key on logic performed until the end of the starting of the vehicle, and the (C) process may be a key off logic performed after the end of the starting of the vehicle.

In the present exemplary embodiment, the process (A) may include the following steps.

First, an air conditioner is operated by an operation of a cooling mode of the vehicle according to an operation of the user or a setting during the driving of the vehicle (S1).

In this state, the controller in determines whether the arrival time from the location of the vehicle currently being driven to the destination is 3 minutes or less through the output signal output from the navigation system 21 (S2).

In the step of determining whether the arrival time to the destination is 3 minutes or less through the output signal output from the navigation system 21 by the controller in (S2), if the condition is not satisfied, the controller in may return the control to the step (S1) of operating the air conditioner for the cooling of the vehicle according to the operation or setting of the user during the driving of the vehicle.

In contrast, in the step (S2), if it is determined that the destination arrival time of the vehicle is less than 3 minutes (i.e., if the condition is satisfied), the controller in determines whether the absolute value of the difference of the predetermined target temperature of the evaporator and the actual temperature of the evaporator is equal to or lower than 3° C. (S3).

In the step (S3) of determining whether the absolute value of the difference of the target temperature of the evaporator and the actual temperature of the evaporator is equal to or lower than 3° C., if the condition is satisfied, the controller 10 performs the process B.

In the process B, if it is determined that the absolute value of the difference of the predetermined target temperature of the evaporator and the actual temperature of the evaporator is equal to or lower than 3° C. through the process A (i.e., if the condition is satisfied), the controller 10 determines whether the evaporator needs cleaning (S4).

Here, the cleaning of the evaporator means that the moisture may be generated on the outside of the evaporator, thereby increasing the temperature of the evaporator to dry the moisture.

If it is determined that the cleaning of the evaporator is necessary (i.e., if the condition is satisfied), the controller 10 determines whether a dehumidification mode is necessary (S5).

In the step (S5) of determining whether the dehumidification mode is necessary, if it is determined that the dehumidification mode is not necessary, the controller 10 controls the blow motor 40, the compressor 40, and the vent discharge control unit 60 (S6).

In the step (S6) of controlling the blow motor 40, the compressor 50, and the vent discharge control unit 60, the controller 10 raises an RPM of the blow motor 40 and lowers the RPM of the compressor 50 to be minimally driven.

In addition, the controller 10 may selectively open a floor or defrost vent by controlling the vent discharge control unit 60 so as to maintain the airflow volume of the dash vent.

Here, if the RPM of the blow motor 40 is raised, the airflow volume blown to the dash vent may be increased, such that the occupant may sensitively react to the increase in the airflow volume.

That is, the controller 10 may maintain the airflow volume of the dash vent by controlling the vent discharge control unit 60 so that the occupant cannot feel an increase in airflow volume.

Accordingly, the flow amount of the refrigerant inflowing from the compressor 50 to the evaporator is minimized, and the flow amount of the outdoor air passing through the evaporator through the operation of the blow motor 40 is increased.

Then, as the temperature of the evaporator is close to the target temperature of the evaporator, the moisture may be prevented from occurring outside of the evaporator due to the temperature difference.

Next, the controller 10 determines whether external humidity is higher than internal humidity based on the data detected from the data detecting unit 20 (S7).

In the step (S7), if it is determined that the external humidity is higher than the internal humidity (i.e., if the condition is satisfied), the controller 10 controls the outdoor air/indoor air mode operation unit 70 to operate an indoor air circulation mode (S8).

In contrast, in the step (S7) if it is determined that the external humidity is lower than the internal humidity (i.e., if the condition is not satisfied), the controller 10 controls the outdoor air/indoor air mode operation unit 70 to operate an outdoor air circulation mode (S9).

Then, if the vehicle arrives at the destination and the starting is finished, (S10), the controller 10 terminates all operations performed in each step of the processes A and B included in the above-described key on logic.

Here, if it is determined that the cleaning of the evaporator is not necessary in the step (S4) of determining the cleaning of the evaporator, the controller 10 may directly perform the step (S10) in which the vehicle arrives at the destination and the starting is ended without performing each step (S5 to S9) described above.

Also, in the state that cleansing of the evaporator is necessary, in the step S5 of determining whether the dehumidification mode is necessary, if it is determined that the dehumidification mode is necessary, the controller 10 may directly perform the step (S10) in which the vehicle arrives at the destination and the starting is finished without performing the steps (S6 to S9) described above.

On the other hand, in the present exemplary embodiment, in the step (S4) of determining whether the evaporator needs cleaning and the step (S5) of determining whether the dehumidification mode is necessary, the controller 10 may output an operation selection button with a guidance message on the display unit 30 to give the option of the cleaning operation of the evaporator and the operation of the dehumidification mode to the occupant.

That is, in the case that the cleaning of the evaporator is not required to prevent the water generation at the evaporator by the determination of the controller 10 and the indoor operation of the dehumidification mode is necessary, the control steps to prevent the water generation of the evaporator may be performed according to the selection of the occupant.

Figure 3:
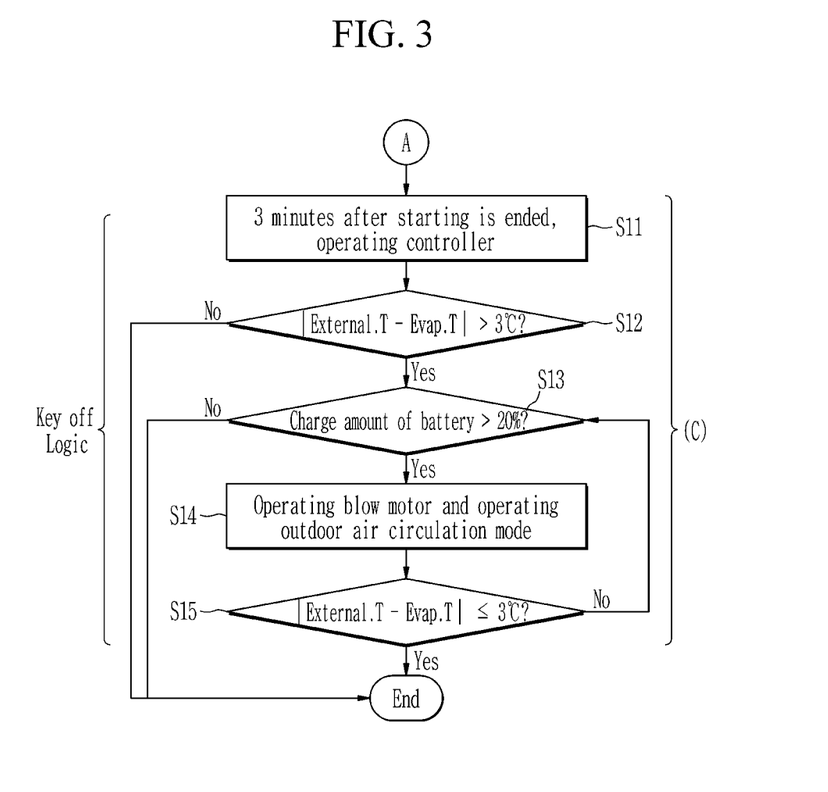

Also, the process C starts after the running of the vehicle has finished.

First, the controller 10 is operated if 3 minutes have elapsed since the driving of the vehicle is completed and the starting is finished (S11).

Then, the controller 10 determines whether the absolute value of the difference of the external temperature and the temperature of the evaporator is larger than 3° C. based on the data detected from the data detecting unit 20 (S12).

Here, the external temperature may be output to the controller 10 from the external temperature sensor 25, and the temperature of the evaporator may be output to the controller 10 from the evaporator temperature sensor 22.

In the step (S12), if it is determined that the absolute value of the difference of the external temperature and the temperature of the evaporator is larger than 3° C. (i.e., if the condition is satisfied), the controller 10 determines whether the charge amount of the battery is 20% or more based on the data (S13).

Here, the charge amount of the battery may be output from the battery sensor 25 to the controller 10.

In the step (S13) of determining whether the charge amount of the battery is 20% or more, if it is determined that the charge amount of the battery is 20% or more, the controller 10 controls the blow motor 40 and the outdoor air/indoor air mode operation unit 70 (S14).

Here, the controller 10 may maximally operate the blow motor 40, and operate the outdoor air circulation mode by controlling the outdoor air/indoor air mode operation unit 70.

Accordingly, the maximal operation of the blow motor 40 allows a large amount of outdoor air to raise the temperature of the evaporator while passing through the evaporator.

Then, as the temperature of the evaporator is close to the external temperature, the evaporator is prevented from generating the moisture by the temperature difference with the external temperature.

Subsequently, the controller 10 determines whether the absolute value of the difference of the external temperature and the temperature of the evaporator is equal to or less than 3° C. based on the data detected from the data detecting unit 20 (S15), and if the condition is satisfied, the controller 10 finishes the control.

On the other hand, in the step (S12) of determining whether the absolute value of the difference of the external temperature and the temperature of the evaporator is equal to or less than 3° C., if it is determined that the absolute value of the difference of the external temperature and the temperature of the evaporator is less than 3° C. (i.e., the condition is not satisfied), the controller 10 may finish the control.

Also, in the step (S13) of determining whether the charge amount of the battery is 20% or more, if it is determined that the charge amount of the battery is less than 20%, the controller 10 may finish the control.

That is, the controller 10 may determine whether to perform the subsequent step according to the charge amount of the battery.

If the blow motor 40 is operated in the state that the charge amount of the battery is lower than 20%, since the charge amount of the battery may be further reduced and then discharged, the controller 10 may terminate the control without performing the subsequent step even if it is determined that the temperature of the evaporator needs to be increased.

In the step (S15) of determining whether the absolute value of the difference of the external temperature and the temperature of the evaporator is equal to or lower than 3° C., if it is determined that the absolute value of the difference of the external temperature and the temperature of the evaporator is larger than 3° C., the controller 10 may return to the step (S13) of determining whether the charge amount of the battery is 20% or more.

After returning to the step S13 of determining whether the charge amount of the battery is 20% or more, the above-described steps are repeatedly performed.

As above-described, as the control method of the air conditioning system for the vehicle according to an exemplary embodiment of the present invention performs the above-described steps to increase the temperature of the evaporator to be dried, the moisture of the evaporator may be prevented from occurring due to the temperature difference, and the contamination of the evaporator due to moisture generation may be preemptively prevented.

As above-described, if the control method of the air conditioning system for the vehicle according to an exemplary embodiment of the present invention is applied, the evaporator may be selectively dried by sensing the temperature of the evaporator in conjunction with the navigation system 21 before arrival at the destination or after the starting of the vehicle has finished, it is possible to preemptively prevent the contamination of the evaporator due to the moisture generation and to suppress the indoor odor generation.

Also, as the present invention essentially preemptively eliminates the unpleasant odor in the vehicle interior when the air conditioning system is in operation by preventing the contamination of the evaporator due to the moisture generation, it may prevent the occupant's discomfort and the deterioration of the occupant's health.

In addition, as the present invention prevents the contamination of the evaporator, the use of separate chemicals for cleaning the evaporator and the frequent replacement of air conditioner filters may be minimized, thereby reducing a maintenance cost and improving the overall marketability of the vehicle.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A method of controlling an air conditioner for a vehicle, the method comprising:
   A) determining whether arrival at a destination is within a predetermined period of time based on data detected from a data detector by a controller and comparing a target temperature of an evaporator with an actual temperature of the evaporator in a state of cooling a vehicle interior while the vehicle is running to determine whether the evaporator needs cleaning;
   B) activating a blow motor, a compressor, and a vent discharge controller in response to determining the evaporator needs cleaning by the controller through step A, and controlling an outdoor air/indoor air mode operator by detecting external humidity and internal humidity; and
   C) activating the blow motor and the outdoor air/indoor air mode operator based on comparing an external temperature with the actual temperature of the evaporator and determining a charge amount of a battery based on the data detected from the data detector after a predetermined time when driving of the vehicle is completed and deactivating the blow motor and the outdoor air/indoor air mode operator when an absolute value of a difference between the external temperature and the actual temperature of the evaporator is equal to or lower than a predetermined temperature difference.

2. The method of claim 1, wherein step A comprises:
operating the air conditioner for cooling the vehicle according to an operation of a user or a setting during the running of the vehicle;
determining whether a destination arrival time is within the predetermined period of time using an output signal output from a navigation system of the data detector; and
determining whether an absolute value of a difference between the target temperature of the evaporator and the actual temperature of the evaporator is equal to or lower than the predetermined temperature difference when it is determined that the destination arrival time is within the predetermined period of time.

3. The method of claim 2, wherein when the destination arrival time is within the predetermined period of time, repeating operating the air conditioner for the cooling of the vehicle according to the operation of the user or the setting during the running of the vehicle.

4. The method claim 1, wherein step B comprises:
determining whether to clean the evaporator by the controller when it is determined that the absolute value of the difference of the target temperature of the evaporator and the actual temperature of the evaporator is equal to or lower than the predetermined temperature difference through the step A;
determining whether a dehumidification mode is necessary by the controller when it is determined that the cleaning of the evaporator is necessary;
activating the blow motor, the compressor and the vent discharge controller when it is determined that the dehumidification mode is necessary;
determining whether an external humidity is higher than an internal humidity based on the data detected from the data detector;
operating an indoor air circulation mode by activating the outdoor air/indoor air mode operation operator when it is determined that the external humidity is higher than the internal humidity; and
deactivating the blow motor, the compressor and the vent discharge controller when the vehicle arrives at the destination.

5. The method of claim 4, wherein, in the step of determining whether the evaporator is cleaned by the controller, when the cleaning of the evaporator is not necessary, deactivating the blow motor, the compressor and the vent discharge controller.

6. The method of claim 4, wherein, in the step of determining whether the dehumidification mode is necessary, when it is determined that the dehumidification mode is necessary, deactivating the blow motor, the compressor and the vent discharge controller.

7. The method of claim 4, wherein, in the step of activating the compressor, the blow motor, and the vent discharge controller by the controller, the controller decreases an RPM (revolutions per minute) of the compressor, increases an RPM of the blow motor, and opens a floor or defrost vent by causing the vent discharge controller to maintain airflow volume of a dash vent.

8. The method of claim 4, wherein step B further comprises placing the outdoor air/indoor air operator in an outdoor air circulation mode when it is determined that the external humidity is lower than the internal humidity in the step of determining whether the external humidity is higher than the internal humidity.

9. The method of claim 4, wherein, when determining whether the cleaning of the evaporator is necessary and determining whether the dehumidification mode is necessary, the controller provides an option to an occupant by outputting an operation selection button to a display along with a guidance message.

10. The method of claim 1, wherein step C comprises:
operating the controller when the predetermined period of time has elapsed since the running of the vehicle is completed;
determining whether an absolute value of the difference of the external temperature and the actual temperature of the evaporator is larger than the predetermined temperature difference based on the data detected from the data detector;
determining whether the charge amount of the battery is at least a predetermined charge amount by the controller based on the data when it is determined that the absolute value of the difference of the external temperature and the actual temperature of the evaporator is larger than the predetermined temperature difference;
activating the blow motor and the outdoor air/indoor air mode operator when it is determined that the charge amount of the battery is at least the predetermined charge amount; and
determining whether the absolute value of the difference of the external temperature and the actual temperature of the evaporator is equal to or lower than the predetermined temperature difference based on the data detected from the data detector, and deactivating the blow motor and the outdoor air/indoor air mode operator the absolute value of the difference of the external temperature and the actual temperature of the evaporator is equal to or lower than the predetermined temperature difference.

11. The method of claim 10, wherein, in determining whether the absolute value of the difference of the external temperature and the actual temperature of the evaporator is larger than the predetermined temperature difference, when it is determined that the absolute value of the difference of the external temperature and the actual temperature of the evaporator is equal to or lower than the predetermined temperature difference, deactivating the blow motor and the outdoor air/indoor air mode operator.

12. The method of claim 10, wherein, in determining whether the charge amount of the battery is at least the predetermined charge amount, when it is determined that the charge amount of the battery is less than the predetermined charge amount, the controller deactivates the blow motor and the outdoor air/indoor air mode operator.

13. The method of claim 10, wherein, in determining whether the absolute value of the difference of the external temperature and the actual temperature of the evaporator is equal to or lower than the predetermined temperature difference, when it is determined that the absolute value of the difference of the external temperature and the actual temperature of the evaporator is larger than the predetermined temperature difference, performing the step of determining whether the charge amount of the battery is at least the predetermined charge amount.

14. The method of claim 10, wherein, in activating the blow motor and the outdoor air/indoor air mode operator, the controller increases an RPM (revolutions per minute) of the blow motor and causes the outdoor air/indoor air mode operator to operate an outdoor air circulation mode.

15. The method of claim 10, wherein:
the predetermined temperature difference is 3° C.; and
the predetermined charge amount is 20%.

16. The method of claim 1, wherein the data detector comprises:
a navigation system for detecting an expected arrival time at the destination;
an evaporator temperature sensor measuring a temperature of the evaporator;
a humidity sensor measuring external humidity and interior humidity;
an external temperature sensor measuring the external temperature; and
a battery sensor measuring the charge amount of the battery.

17. The method of claim 1, wherein step A and the B are performed when the vehicle is operating, and step C is performed after the vehicle has stopped operating.

18. The method of claim 1, wherein the predetermined period of time is three minutes.

19. The method of claim 1, wherein the predetermined temperature difference is 3° C.

20. A vehicle comprising:
a vehicle body including a vehicle interior;
an air conditioner;
an outdoor air/indoor air mode operator;
an evaporator;
a blow motor;
a compressor;
a vent discharge controller;
a navigation system configured to detect an expected arrival time at a destination;
an evaporator temperature sensor configured to measure a temperature of the evaporator;
a humidity sensor configured to measure an external humidity and an interior humidity;
an external temperature sensor configured to measure an external temperature;
a battery sensor configured to measure a charge amount of a battery; and
a controller configured to:
determine whether arrival at the destination is within a predetermined period of time based on the expected arrival time detected from the navigation system;
compare a target temperature of the evaporator with the measured temperature of the evaporator in a state of cooling the vehicle interior while the vehicle is running;
activate the blow motor, the compressor and the vent discharge controller based on determining whether the evaporator needs cleaning when determining whether the arrival is within the predetermined period of time;
receive the external humidity and the interior humidity from the humidity sensor;
activate the blow motor and the outdoor air/indoor air mode operator based on comparing the external temperature with the temperature of the evaporator;
determine the charge amount of the battery based on data detected from the battery sensor after a predetermined time when driving of the vehicle is completed and starting is finished; and
deactivate the blow motor and the outdoor air/indoor air mode operator when an absolute value of a difference of the external temperature and the temperature of the evaporator is equal to or lower than a predetermined temperature difference.

* * * * *

UNITED STATES PATENT AND TRADEMARK OFFICE
CERTIFICATE OF CORRECTION

| | | |
|---|---|---|
| PATENT NO. | : 11,247,656 B2 | Page 1 of 1 |
| APPLICATION NO. | : 16/663630 | |
| DATED | : February 15, 2022 | |
| INVENTOR(S) | : Yeon Ho Kim et al. | |

It is certified that error appears in the above-identified patent and that said Letters Patent is hereby corrected as shown below:

In the Claims

Claim 4, Column 11, Line 42; delete "operation" in between "mode" and "operator".

Signed and Sealed this
Fifteenth Day of March, 2022

Drew Hirshfeld
*Performing the Functions and Duties of the
Under Secretary of Commerce for Intellectual Property and
Director of the United States Patent and Trademark Office*